US012272341B2

(12) United States Patent
Ouyang et al.

(10) Patent No.: US 12,272,341 B2
(45) Date of Patent: Apr. 8, 2025

(54) CONTROLLABLE MUSIC GENERATION (71) Applicant: LEMON INC., Grand Cayman (KY)

(72) Inventors: Zhihao Ouyang, Los Angeles, CA (US); Keunwoo Choi, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 730 days.

(21) Appl. No.: 17/521,435

(22) Filed: Nov. 8, 2021

(65) Prior Publication Data
US 2023/0147185 A1 May 11, 2023

(51) Int. Cl.
*G10H 1/00* (2006.01)
*G06N 20/00* (2019.01)

(52) U.S. Cl.
CPC ........... *G10H 1/0025* (2013.01); *G06N 20/00* (2019.01); *G10H 2210/036* (2013.01); *G10H 2210/115* (2013.01); *G10H 2210/571* (2013.01); *G10H 2250/005* (2013.01)

(58) Field of Classification Search
CPC ........... G10H 1/0025; G10H 2210/036; G10H 2210/115; G10H 2210/571; G10H 2250/005; G06N 20/00
USPC .......................................................... 84/609
See application file for complete search history.

(56) References Cited

U.S. PATENT DOCUMENTS

| | | | |
|---|---|---|---|
| 2009/0069914 A1* | 3/2009 | Kemp ..................... | G10L 25/00 700/94 |
| 2020/0342646 A1* | 10/2020 | Wang ..................... | G06N 3/045 |
| 2021/0125593 A1* | 4/2021 | Pachet .................. | G10H 1/0025 |
| 2021/0158790 A1* | 5/2021 | Huang ................... | G06N 20/00 |
| 2023/0147185 A1* | 5/2023 | Ouyang ................. | G06N 3/088 84/609 |

(Continued)

FOREIGN PATENT DOCUMENTS

| | | | | |
|---|---|---|---|---|
| CN | 110853604 | A | * 2/2020 | |
| CN | 112102801 | A | * 12/2020 | G06F 16/65 |

(Continued)

OTHER PUBLICATIONS

International Patent Application No. PCT/SG2022/050808; Int'l Search Report; dated Jun. 1, 2023; 4 pages.

(Continued)

*Primary Examiner* — Christina M Schreiber
(74) *Attorney, Agent, or Firm* — BakerHostetler (57) ABSTRACT The present disclosure describes techniques for controllable music generation. The techniques comprise extracting latent vectors from unlabelled data, the unlabelled data comprising a plurality of music note sequences, the plurality of music note sequences indicating a plurality of pieces of music; clustering the latent vectors into a plurality of classes corresponding to a plurality of music styles; generating a plurality of labelled latent vectors corresponding to the plurality of music styles, each of the plurality labelled latent vectors comprising information indicating features of a corresponding music style; and generating a first music note sequence indicating a first piece of music in a particular music style among the plurality of music styles based at least in part on a particular labelled latent vector among the plurality of labelled latent vectors, the particular labelled latent vector corresponding to the particular music style.

20 Claims, 8 Drawing Sheets

(56) References Cited

U.S. PATENT DOCUMENTS

| | | | | |
|---|---|---|---|---|
| 2023/0153683 A1* | 5/2023 | Akama | ............. | G06N 20/00 706/12 |
| 2024/0071342 A1* | 2/2024 | Kant | ............. | G10H 5/005 |
| 2024/0160772 A1* | 5/2024 | Weggenmann | ....... | G06F 40/284 |

FOREIGN PATENT DOCUMENTS

| | | | | |
|---|---|---|---|---|
| WO | WO-2010003521 A1 * | 1/2010 | ............. | G10L 19/00 |
| WO | WO-2021225741 A1 * | 11/2021 | ............. | G06N 20/00 |
| WO | WO-2023080847 A2 * | 5/2023 | ............. | G06N 20/00 |

OTHER PUBLICATIONS

Lim et al.; "ClaviNet: Generate Music With Different Musical Styles"; IEEE Multimedia; vol. 28; Jan.-Mar. 2021; p. 83-93 (*contains Abstract Only*).

"Controlled Music Generation from Unlabeled Data"; https://github.com/oyzh888/GMM_MusicVAE/blob/aa7f4a23b50d62b9a85526e1f17dd32569c44a79/index.md; accessed May 18, 2023; 2 pages.

Tan et al.; "Music Fadernets: Controllable Music Generation Based on High-Level Features Via Low-Level Feature Modelling"; $21^{st}$ Int'l Society of Music Information Retrieval Conf.; Jul. 2020; 8 pages.

Roberts et al.; "A Hierarchical Latent Vector Model for Learning Long-Term Structure in Music"; Proceedings of the $35^{th}$ Int'l Conf. on Machine Learning; 2018; p. 4364-4373.

Hadjeres et al.; "GLSR-VAE: Geodesic latent space regularization for variational autoencoder architectures"; IEEE Symposium Series on Computational Intelligence; 2017; 11 pages.

Brunner et al.; "MIDI-VAE: Modeling Dynamics and Instrumentation of Music with Applications to Style Transfer"; $19^{th}$ Int'l Society for Music Information Retrieval Conf.; 2018; 8 pages.

Kingma et al.; "Auto-encoding variational bayes"; Machine Learning; 2013; 14 pages.

Sohn et al.; "Learning structured output representation using deep conditional generative models"; Advances in Neural Information Processing Systems; 2015; p. 3483-3491.

Chen et al.; "Isolating Sources of Disentanglement in Variational Autoencoders"; Advances in Neural Information Processing Systems; 2018; p. 2610-2620 (Abstract only).

Higgins et al.; "beta-VAE: Learning Basic Visual Concepts with a Constrained Variational Framework"; Int'l Conf. on Learning Representations; vol. 2; 2017; 22 pages.

Dinculescu et al.; "MidiMe: Personalizing a MusicVAE model with user data"; $33^{rd}$ Conf. on Neural Information Processing Systems; 2019; 3 pages.

Carl Doersch; "Tutorial on Variational Autoencoders"; arXiv:1606.05908; 2016; 23 pages.

\* cited by examiner

Extract latent vectors from unlabelled data, the unlabelled data comprising a plurality of music note sequences, the plurality of music note sequences indicating a plurality of pieces of music 602

Cluster the latent vectors into a plurality of classes corresponding to a plurality of music styles 604

Generate a plurality of labelled latent vectors corresponding to the plurality of music styles, each of the plurality labelled latent vectors comprising information indicating features of a corresponding music style among the plurality of music styles 606

Generate a first music note sequence indicating a first piece of music in a particular music style among the plurality of music styles based at least in part on a particular labelled latent vector among the plurality of labelled latent vectors, the particular labelled latent vector corresponding to the particular music style 608

```
┌─────────────────────────────────────────────────────────────┐
│ Interpolate a specific latent vector corresponding to a type│
│ of chord sequence with another latent vector corresponding  │
│ to a random music sequence to generate a mixed latent vector│
│ corresponding to a new music sequence, wherein the new music│
│ sequence is harmonic with both the chord sequence and the   │
│ random music sequence 702                                   │
└─────────────────────────────────────────────────────────────┘
                              │
                              ▼
┌─────────────────────────────────────────────────────────────┐
│              Input the mixed latent vector to a VAE 704     │
└─────────────────────────────────────────────────────────────┘
                              │
                              ▼
┌─────────────────────────────────────────────────────────────┐
│ Generate a second music note sequence indicating a second   │
│ piece of music in a customized style based on the mixed     │
│ latent vector 706                                           │
└─────────────────────────────────────────────────────────────┘
```

CONTROLLABLE MUSIC GENERATION

BACKGROUND

Techniques for music generation are widely used in music, filmmaking, and entertainment industries. Recently, the demand for music generation is getting even stronger. Traditional music generation has played an important role in the development of music generation. However, conventional music generation may not fulfil needs of users due to various limitations. Therefore, improvements in music generation are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Music generation using deep learning techniques has been a topic of interest in recent years. The application of artificial intelligence (AI) technology has greatly improved music generation system for generating realistic and high-quality music. Music data is a typical form of high dimensional data. It is unrealistic to model music sequences (i.e., melodies) by exhaustively enumerating all possible variations of music notes. Variational autoencoder (VAE) is a latent space model and learns through low-dimension compression of raw data. VAE has demonstrated advantages in modeling sequential data with long-term structures, such as music. Meanwhile, VAE suggests that latent variables contain rich hidden features related to music. VAE has been a trending model that may be used to represent the fundamental characteristics of music sequences.

Although VAE may generate high-quality music, it still suffers from poor controllability. It is difficult to control the behavior of VAE. Consequently, it is challenging to generate music in a specific style using VAE. The crux behind lack of controllability is lacking interpretability. Unfortunately, there are few works focus on bridging the relationship between the latent spaces and the music semantic meanings.

To address the issue, a machine learning based model, Gaussian Mixture Model (GMM), is provided to enhance the interpretability of VAE by disentangling its latent space. GMM may help understand the semantic meaning in the latent spaces. Therefore, music generation process may be controlled by using these semantic meanings mined by GMM. Using VAE combined with GMM, it is possible to generate highly controlled music through an unsupervised manner. Besides, with the Gaussian prior, latent variables retrieved from GMM clustering results are robust, especially in few-shot scenarios. Significant improvement on quality of music is also achieved. In this way, the required amount of data for new stylistic music generation can be substantially reduced.

Figure 1:
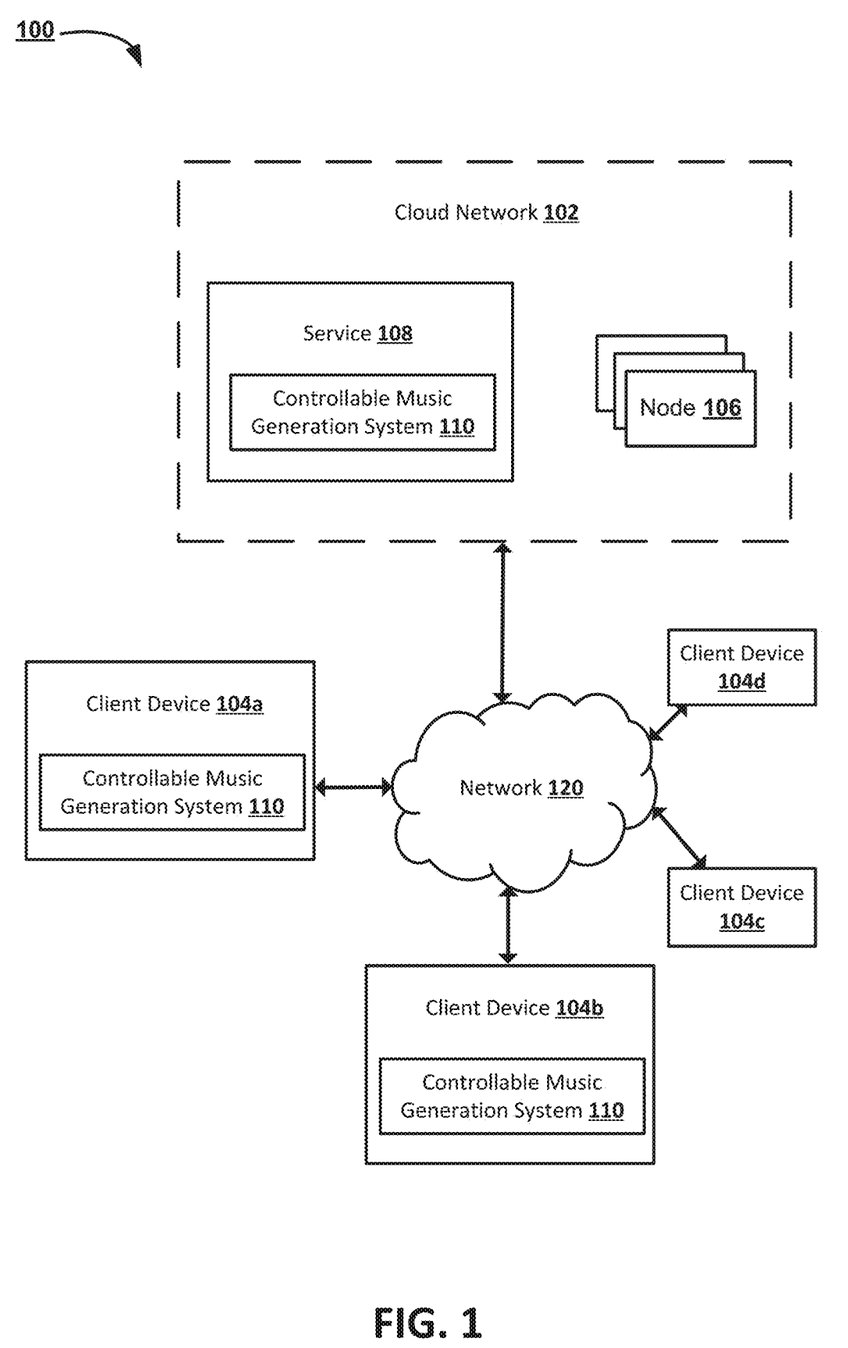
FIG. 1 illustrates an example system including a cloud service in accordance with the present disclosure.

FIG. 1 illustrates example components of a cloud computing system 100. By way of example and without limitation, cloud computing system 100 may be used to perform aspects of the disclosed subject matter. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and by other cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. By way of example and without limitation, a PC user device accessing a cloud-based application may not be aware that the PC downloads program logic and/or data from the cloud computing system, or that the PC offloads processing or storage functions to the cloud computing system, for example.

In FIG. 1, cloud computing system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 may comprise one or more public networks (e.g., the Internet) and/or one or more private networks. A private network may include a wireless local area network (WLAN), a local area network (LAN), a wide area network (WAN), a cellular network, or an intranet. The network 120 may comprise wired network(s) and/or wireless network(s). For example, the network 120 may comprise physical links, such as coaxial cable links, twisted pair cable links, fiber optic links, a combination thereof, and/or the like. As another example, the network 120 may comprise wireless links, such as cellular links, satellite links, Wi-Fi links and/or the like. The network 120 may comprise a variety of network devices, such as routers, switches, multiplexers, hubs, modems, bridges, repeaters, firewalls, proxy devices, and/or the like.

The plurality of client devices 104a-d may comprise any type of computing device, such as a mobile device, a tablet device, laptop, a desktop computer, a smart television, or other smart device (e.g., smart watch, smart speaker), digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The cloud network 102 may comprise a plurality of computing nodes 106. The plurality of computing nodes 106 may be implemented as one or more computing devices, one or more processors, one or more virtual computing instances, a combination thereof, and/or the like. The plurality of computing nodes 106 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of computing nodes 106 may host a variety of services. In an embodiment, the nodes 106 host a service 108, such as a music generation service. The service 108 and/or the client devices 104a-d may comprise a controllable music generation (CMG) model 110. The CMG model 110 may be configured to generate music in specific styles. In one example, the CMG model 110 may comprise a VAE and a GMM. The GMM may contribute to generate music in specific styles since GMM may identify semantic meaning in the latent spaces. The CMG model 110 may generate highly controlled music through an unsupervised manner.

Unlabelled music data may be used to train a VAE that comprises a VAE encoder and a VAE decoder. In one embodiment, the VAE encoder may encode unlabeled music data to latent vectors in latent space. The latent vectors may follow Gaussian distributions. The music data may comprise any music data input to the VAE encoder. The music data may be music note sequences corresponding to pieces of music. The music note sequences may be converted from midi files.

The VAE decoder may learn to decode latent vectors into pieces of music. In one example, the latent vectors may be unlabelled latent vectors generated by the VAE encoder. In another example, the latent vectors may be labelled latent vectors generated by the GMM. The piece of music, which is generated by the VAE encoder, may comprise a music note sequence. The piece of music may be in a particular music style, for example, in Beethoven's style.

The GMM may contribute to generate music in specific styles using unlabelled music data. In one embodiment, the GMM may cluster unlabelled latent vectors into a plurality of classes corresponding to a plurality of music styles. The GMM may generate a plurality of labelled latent vectors sampled from the Gaussian distributions. The plurality of labelled latent vectors may correspond to a plurality of music styles. Each labelled latent vector may comprise information indicating features of a corresponding music style. The GMM may provide parameters of the Gaussian distribution for each class.

It should be appreciated that FIG. 1 is merely illustrative and that other implementations might be utilized. For instance, the client devices 104a-d, the service 108, or other computing devices may be used singly or in combination to implement techniques of advertising as described in the present disclosure. It should also be appreciated that network topology illustrated in FIG. 1 has been greatly simplified and that many more networks, devices, and databases may be utilized to interconnect various computing systems.

Figure 2:
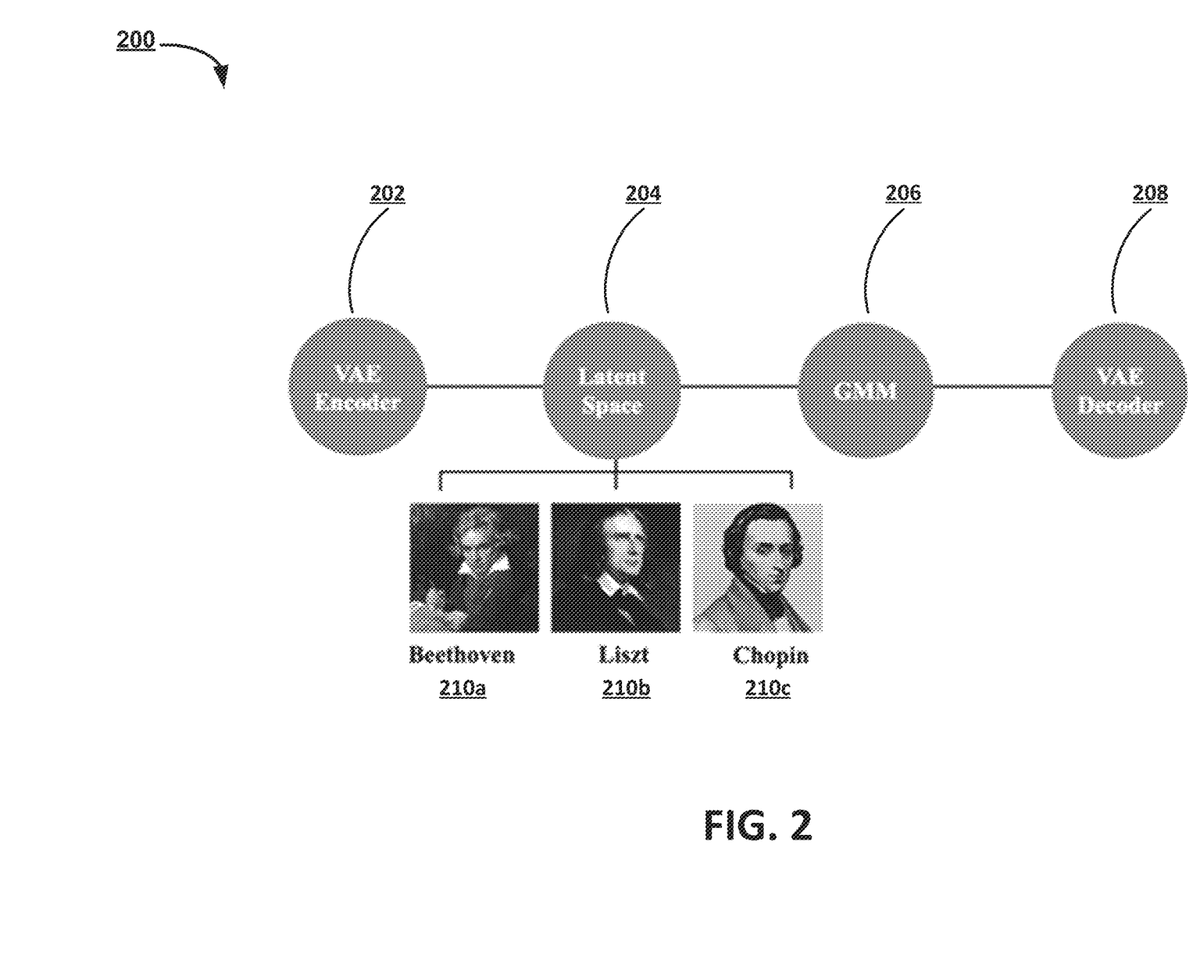
FIG. 2 illustrates an example framework for controllable music generation which may be used in accordance with the present disclosure.

FIG. 2 illustrates an example framework 200 for a controllable music generation model, such as the CMG model 110 in FIG. 1. The CMG model may be configured to generate music in specific styles. The CMG model may comprise a VAE encoder 202, a GMM 206, and a VAE decoder 208.

The VAE encoder 202 may be configured to perform encoding tasks. In one embodiment, the VAE encoder 202 may encode unlabelled music data. The VAE encoder 202 may encode unlabelled music data into unlabelled latent vectors in latent space 204. The unlabelled music data may comprise any music data input to the VAE encoder 202. The unlabelled music data may be music note sequences corresponding to a plurality of pieces of music. The music note sequences may be converted from midi files. The unlabelled latent vectors in latent space 204 may follow Gaussian distributions.

The GMM 206 may contribute to generate music in specific styles using unlabelled music data. In one embodiment, the GMM 206 may cluster unlabelled latent vectors into a plurality of classes, for example, K classes. K implies the number of potential distinct styles that the unlabelled music data may contain. The plurality of classes may correspond to a plurality of music styles. Each class may correspond to a music style. The GMM 206 may generate a plurality of labelled latent vectors sampled from the Gaussian distributions. The plurality of labelled latent vectors may correspond to a plurality of music styles. Each labelled latent vector may comprise information indicating features of a corresponding music style.

Unlabelled latent vectors in latent space 204 may be extracted from music pieces of different composers, such as Beethoven 210a, Liszt 210b, and Chopin 210c. The GMM 206 may provide cluster membership information, such as composer's style. The GMM 206 may be used to identify semantic meanings in the latent spaces 204. The GMM 206 may interpret the music meaning of the latent vectors. The GMM 206 may classify latent vectors into different classes. The GMM 206 may provide parameters of the Gaussian distribution for each class. The labelled latent vectors generated by GMM 206 may be fed to VAE decoder 208 to generate a piece of music in a specific style.

The VAE decoder 208 may encode latent vectors into music pieces. In one embodiment, the latent vectors may be labelled latent vectors generated by the GMM 206. The piece of music generated by the VAE decoder 208 may comprise a music note sequence, and the piece of music may be in a particular music style, for example, in Beethoven's style.

The CMG model needs to be trained before it is used to generate music in particular styles. In the training process, unlabelled music data may be used to train a VAE comprising the VAE encoder 202 and the VAE decoder 208. In one embodiment, unlabelled music data may comprise music note sequences. The music note sequences may be converted from midi files. The VAE encoder 202 may learn to encode unlabelled music data to latent vectors in latent space 204. The latent vectors in latent space 204 may follow Gaussian distributions. The VAE decoder 208 may learn to decode latent vectors into music pieces.

The trained VAE encoder 202 may encode unlabelled music data into unlabelled latent vectors. The unlabelled latent vectors generated by the trained VAE may be used to train the GMM 206. The GMM 206 may fit the unlabelled latent vectors and cluster the unlabelled latent vectors into a plurality of classes, such as K classes. K implies the number of potential distinct styles that the unlabelled music data may contain. The GMM 206 may provide the parameters of the Gaussian distribution for each class.

Once fully trained, the CMG model may be used to generate highly controlled music through an unsupervised manner. GMM 206 may contribute to generate music in specific styles since GMM 206 may identify the meaning of latent vectors. For example, given a particular style (e.g., Beethoven's style), labelled latent vectors corresponding to the particular style may be fed into the VAE decoder 208. The VAE decoder may generate a piece of music in the particular style (e.g., Beethoven's style).

Figure 3:
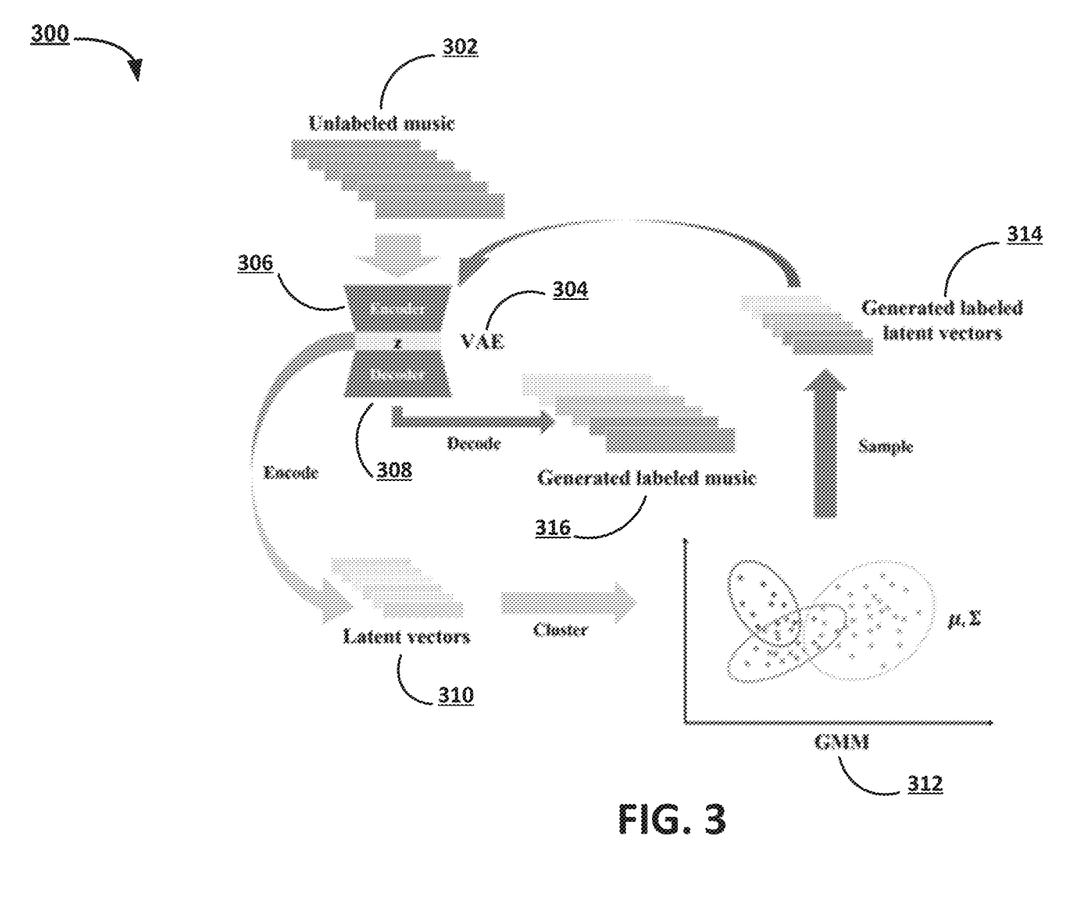
FIG. 3 illustrates an example process for generating music in specific styles in accordance with the present disclosure.

FIG. 3 illustrates an example process 300 for generating music in specific styles from unlabeled data using a CMG model. The CMG model may comprise a VAE 304 and a GMM 312. The VAE 304 may comprise an encoder 306 and a decoder 308. The CMG may find useful semantic meaning from unlabelled music data. The GMM 312 may contribute to generate music in specific styles. The GMM may interpret the music meaning of latent vectors in latent space. The GMM may classify latent vectors into different classes according to the semantic meanings. The CMG model comprising the VAE 304 and the GMM 312 may generate highly controlled music through an unsupervised manner.

The CMG model needs to be trained before it is used to generate music in specific style. To train the CMG model, training data, such as training examples, may be generated. The training examples used to train the CMG model may be generated in a variety of different ways. In the training process, unlabelled music data 302 may be used to train the VAE 304. In an embodiment, unlabelled music data 302 may be raw music data comprising music note sequences. The music note sequences may be converted from midi files. The VAE encoder 306 may learn to encode unlabelled music data 302 to latent vectors 310 in latent space. The latent vectors 310 in latent space may follow Gaussian distributions. The VAE decoder 308 may learn to decode latent vectors 310 into pieces of music.

The VAE 304 may map music data sample X (e.g., unlabelled music data 302) to a latent vector z (e.g., latent vectors 310) in the latent space. The latent vector z may follow a standard multivariate Gaussian distribution. The VAE may be trained to maximize the likelihood of sample X with given parameters θ:

$$\max_{\theta} P(X) = \int P(X|z; \theta)P(z)dz, \quad \text{Equation 1}$$

wherein P(X|z; θ) is commonly assumed to be a Gaussian distribution.

To make this optimization feasible, the objective in equation 1 may be derived as.

$$\log P(X) - \mathcal{D}[Q(z|X)\|P(z|X)] = E_{z \sim Q}[\log P(X|z)] - \mathcal{D}[Q(z|X)\|P(z)], \quad \text{Equation 2}$$

wherein $\mathcal{D}(\bullet)$ is the KL-Divergence, $Q(z)$ is PDF of the distribution of latent vectors, and $Q(z|Y)$ is the conditional probability given sample X.

In a similar way, $Q(z|X)$ may be chosen to be a Gaussian distribution $\mathcal{N}(z|\mu(X), \Sigma(X))$. The mean $\mu(\bullet)$ and the variance $\Sigma(\bullet)$ may be both learned through a neural network. In addition, the prior P(z) may be a standard multivariate Gaussian distribution $\mathcal{N}(0, 1)$.

In equation 2, P(X|z) may be regarded as the decoder, and Q(z|X) may be regarded as the encoder. Given a sample X, the corresponding latent vector may follow a Gaussian distribution Q(z|X). Any valid latent vector z sampled from the distribution Q(z) may be decoded into a valid music sample by the decoder P(X|z).

The trained VAE 304 may encode unlabelled music data 302 into unlabelled latent vectors 310 in latent space. The unlabelled latent vectors 310, which are generated by the trained VAE 304, may be used to train a GMM 312. The GMM 312 may fit and cluster the unlabelled latent vectors 310 into a plurality of classes, such as K classes. K implies the number of potential distinct styles that the unlabelled music data 302 may contain.

A plurality of unlabelled music samples may be encoded into latent vectors by using an encoder, such as the VAE encoder 306. Each music sample X may be encoded into a latent vector z. Each latent vector z may follow the Gaussian distribution Q(z). The GMM may classify the latent vectors into different classes according to the semantic meanings implied in the original music. The semantic meanings may comprise styles, composers, and so on.

Assuming latent vector z of a sample X depends on the class label y of this sample, and that all the conditional probabilities Q(z|y) are independent Gaussian distributions, then the latent space of a VAE model $Q(z)$ is a Gaussian mixture of these conditional probabilities: $Q(z) = \Sigma_y Q(z|y)P(y)$.

$Q(z)$ may be considered again as follows:

$$Q(z) = \int_x Q(z|X)P(X)dx \quad \text{Equation 3}$$
$$= \sum_y \int_x Q(z|X)P(X|y)P(y)dx$$

$$= \sum_y Q(y, z)$$

$$= \sum_y Q(z|y) P(y),$$

wherein y is the class of music, Q(z|y) is the conditional distribution of latent vector z conditioned on the music classy, and P(X|y) is the conditional distribution of music sample X.

Suppose each class of music is an independent component and there are K classes, the distribution of the latent vectors may be decomposed as $$Q(z) = \sum_{i=1}^{K} Q(z|y_i) P(y_i),$$  Equation 4

Figure 4:
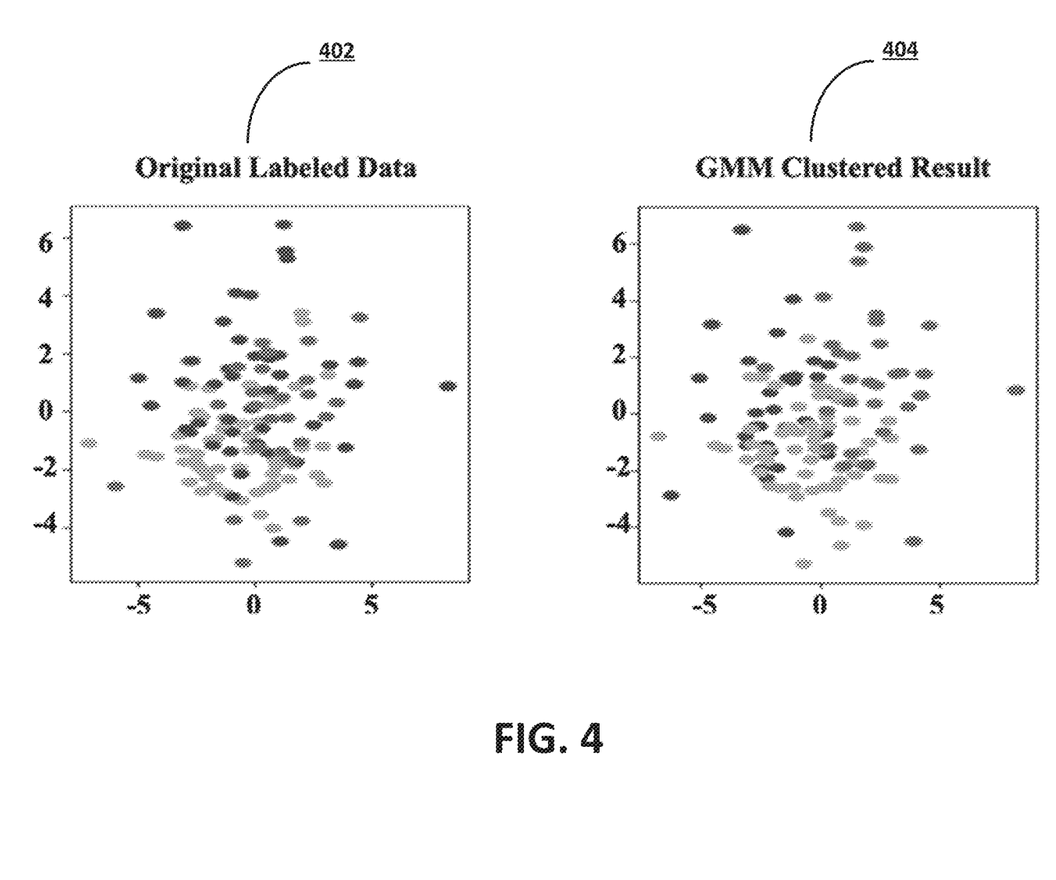
FIG. 4 illustrates example graphs showing a comparison between original labelled data and Gaussian Mixture Model (GMM) clustered result.

The GMM 312 may be used to describe the distribution of latent vectors and perform clustering. The GMM 312 may interpret the music meaning of the latent vectors 310 in latent space. The latent vectors may follow a Gaussian mixture distribution. The GMM 312 may classify unlabelled latent vectors into a plurality of classes according to the semantic meanings. The plurality of classes may correspond to a plurality of music styles. Each class may correspond to a music style. The number of classes K may be either pre-determined or found using the elbow method for clustering analysis. The GMM may provide the parameters of the Gaussian distribution for each class. The GMM 312 can precisely classify unlabelled latent vectors to a plurality of Gaussian distributions. Each distribution of the clustered latent vectors may correspond to a class of music. FIG. 4 illustrates a comparison between original labelled data 402 from Beethoven, Liszt, Chopin and GMM clustered results 404. The GMM clustered results 404 is generated by a trained GMM, such as the GMM 312. As shown in FIG. 4, the GMM clustered results 404 have high similarities to the original labelled data 402, which indicates that the GMM 312 successfully catches the cluster's information and precisely classify unlabelled latent vectors.

A plurality of labelled latent vectors 314 may be generated by GMM 312. The plurality of labelled latent vectors 314 may be sampled from the Gaussian distributions by GMM 312. The plurality of labelled latent vectors 314 may correspond to a plurality of music styles. Each of the plurality of labelled latent vectors 314 may comprise information indicating features of a corresponding music style.

Once VAE 304 and GMM 312 are fully trained, the trained CMG model may generate music in particular styles from unlabelled music data. A piece of labelled music 316 may be generated by the VAE decoder 308. The piece of generated labelled music 316 may be a music note sequence. The music note sequence may indicate a piece of music in a particular music style among a plurality of music styles. The piece of labelled music 316 may be generated based at least in part on a particular labelled latent vector. The particular labelled latent vector may correspond to a particular music style. The particular labelled latent vector may be comprised in a plurality of labelled latent vectors 314 in latent space. In one embodiment, given a particular style (e.g., Beethoven's style), the CMG model, which may comprise trained VAE 304 and GMM 312, may generate a piece of music in the particular style.

Figure 5:
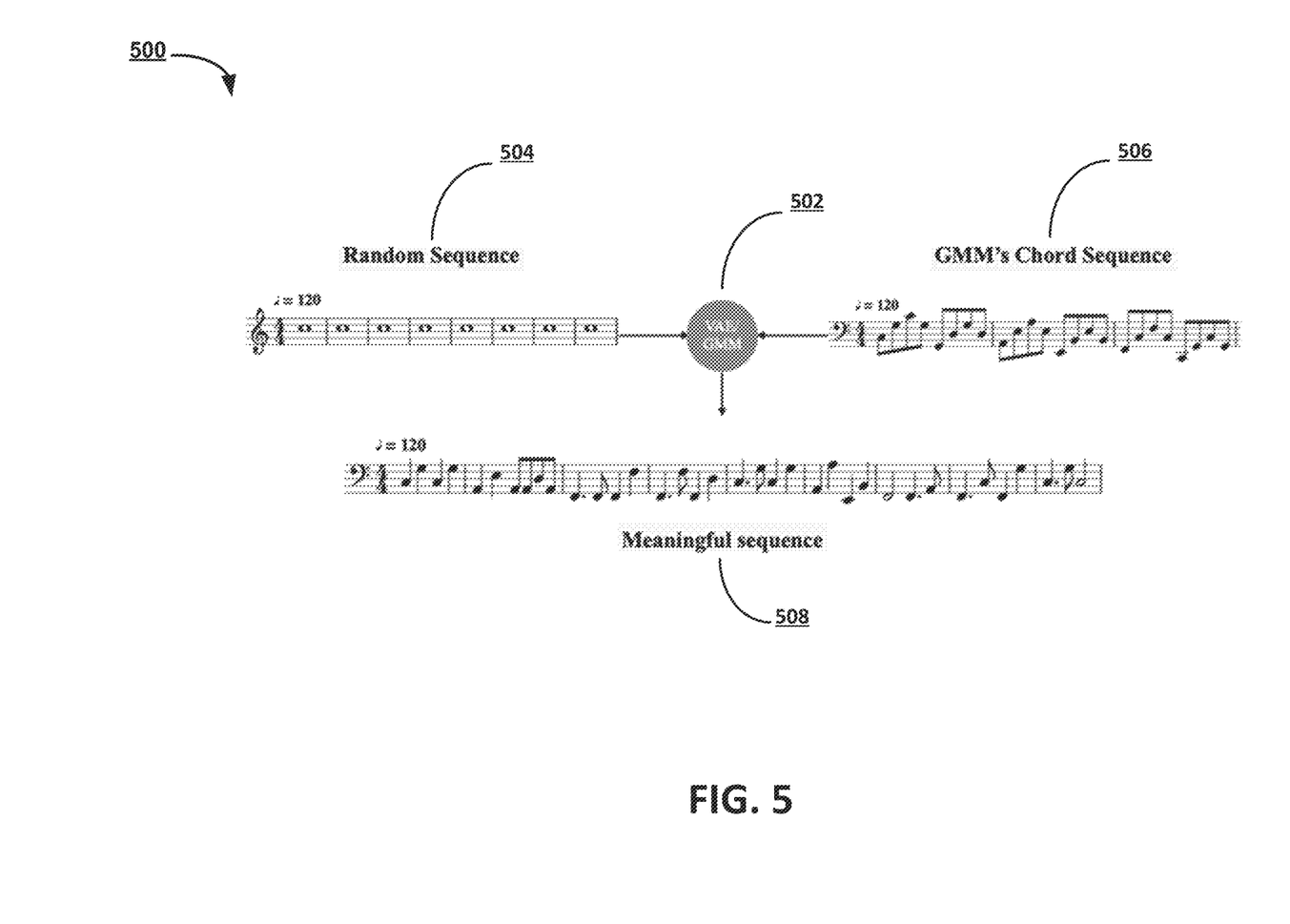
FIG. 5 illustrates an example process for mixing a sequence corresponding to a chord style with a random sequence in accordance with the present disclosure.

FIG. 5 illustrates an example process 500 for mixing a sequence corresponding to a chord style with a random sequence. In one example, a specific latent vector corresponding to the chord sequence 506 may be identified using the GMM. The specific latent vector may be one of the plurality of labelled latent vectors generated by the GMM. The chord sequence 506 may be a music note sequence indicating a type of chord music. In an embodiment, a plurality of unlabelled latent vectors in latent space may be extracted from music pieces. The GMM may be used to cluster the unlabelled latent vectors into labelled latent vectors. Among the labelled latent vectors, a specific latent vector may be identified by the GMM. The specific latent vector may correspond to the GMM's chord sequence 506.

The specific latent vector corresponding to the chord sequence 506 may be interpolated with another latent vector corresponding to a random music sequence 504. A mixed latent vector may be generated by interpolating the specific latent vector with another latent vector. The mixed latent vector may correspond to the meaningful sequence 508. The meaningful sequence 508 may be harmonic with both the chord sequence 506 and the random music sequence 504.

The mixed latent vector may be input to a VAE, such as the VAE 304 shown in FIG. 3. As discussed above, the VAE may have been pre-trained using unlabelled music data. The VAE may comprise a VAE encoder and a VAE decoder. In one embodiment, the mixed latent vectors may be fed to the VAE decoder to generate the meaningful sequence 508.

The meaningful sequence 508 may be generated by the VAE/GMM 502. The meaningful sequence 508 may indicate a second piece of music. The second piece of music may be in a customized style based on the mixed latent vector. In one embodiment, the meaningful music sequence 508 may be generated by the VAE encoder based on the mixed latent vector. The meaningful sequence 508 may indicate a piece of music in a customized style. The meaningful sequence 508 may be harmonic with both the random sequence 504 and the chord sequence 506. Using the CMG model, music in desired style may be generated by interpolating between different latent vectors. The CMG model may be useful for music generation and especially for multi-track music composition.

Figure 6:
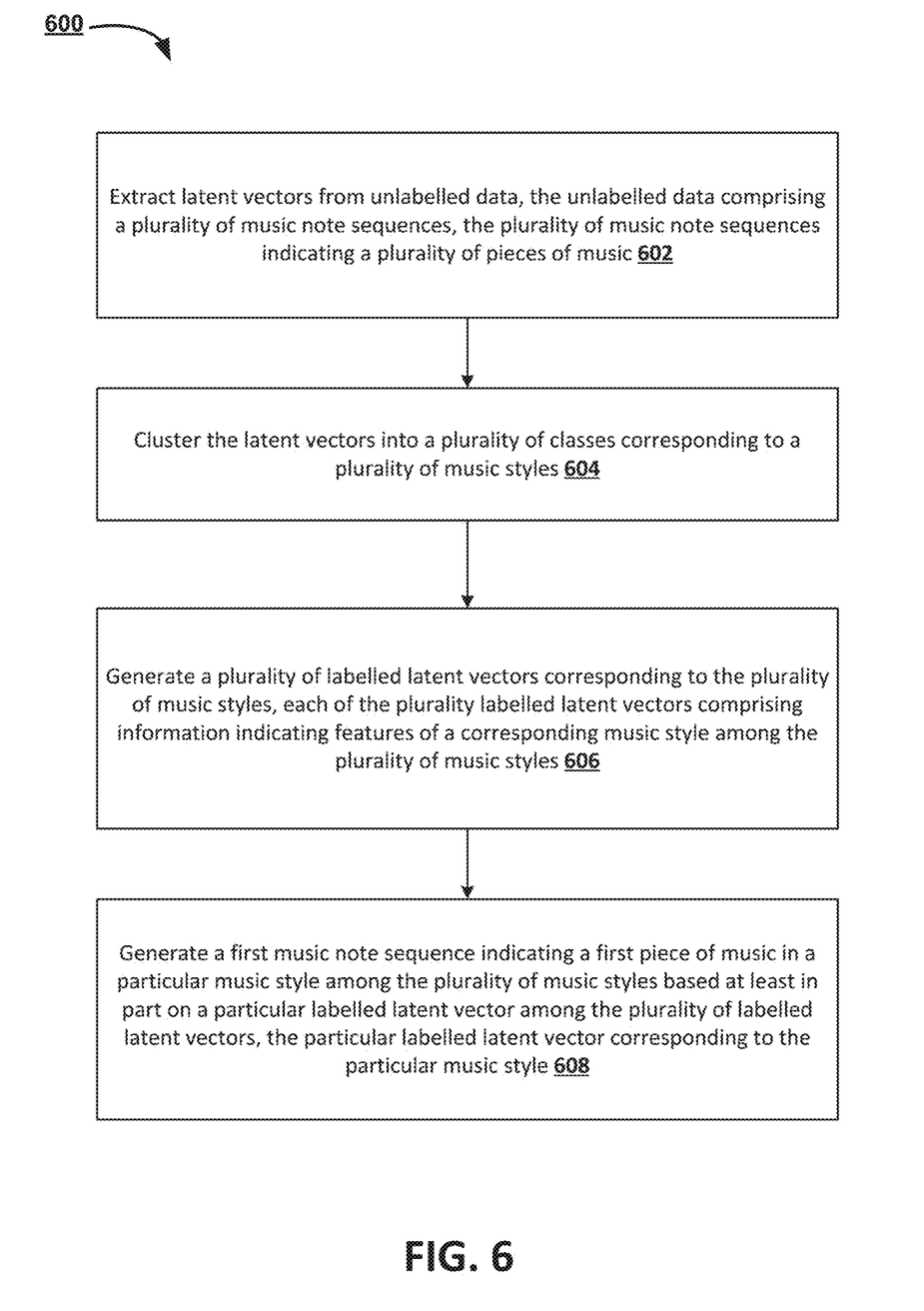
FIG. 6 illustrates an example process for generating music in specific styles in accordance with the present disclosure.

FIG. 6 illustrates an example process 600 of generating controllable music in specific styles using a CMG model comprising a VAE and a GMM, such as the CMG model shown in FIG. 1. Although depicted as a sequence of operations in FIG. 6, those of ordinary skill in the art will appreciate that various embodiments may add, remove, reorder, or modify the depicted operations.

At 602, latent vectors may be extracted from unlabelled data. The unlabelled data may comprise a plurality of music note sequences. The plurality of music note sequences may indicate a plurality of pieces of music. In one embodiment, a trained VAE encoder may be used to extract unlabelled latent vectors in latent space from unlabelled data. The latent vectors in latent space may follow Gaussian distributions. The unlabelled data may be unlabelled music data. The unlabelled music data may comprise any music data input to the VAE encoder. The unlabelled music data may be music note sequences corresponding to a plurality of pieces of music.

At 604, the latent vectors may be clustered into a plurality of classes corresponding to a plurality of music styles. In one embodiment, a GMM may be configured to perform clustering tasks. The GMM may be used to cluster unlabelled latent vectors into a plurality of classes, for example, K classes. K implies the number of potential distinct styles that the unlabelled music data may contain. The plurality of classes may correspond to a plurality of music styles. Each class may correspond to a music style. The GMM may provide cluster membership information, such as composer's style.

At 606, a plurality of labelled latent vectors may be generated. The plurality of labelled latent vectors may correspond to the plurality of music styles. Each of the plurality labelled latent vectors may comprise information indicating features of a corresponding music style among the plurality of music styles.

In one embodiment, a plurality of labelled latent vectors may be generated. In one example, the labelled latent vectors may be generated by a GMM. The GMM may be used to identify the semantic meaning in the latent space. The GMM may fit and cluster the unlabelled latent vectors into a plurality of classes. The GMM may provide parameters of the Gaussian distribution for each class. The plurality of labelled latent vectors may be sampled from the Gaussian distribution. The plurality of labelled latent vectors may correspond to a plurality of music styles. The plurality of labelled latent vectors may comprise information indicating features of a plurality of music styles.

At 608, a first music note sequence may be generated based at least in part on a particular labelled latent vector among the plurality of labelled latent vectors. The first music note sequence may indicate a first piece of music in a particular music style among the plurality of music styles. The particular labelled latent vector may correspond to the particular music style.

In one embodiment, a music note sequence may be generated by the VAE decoder. The generated music note sequence may indicate a piece of music in a particular music style. The particular labelled latent vector may correspond to a particular music style. The particular labelled latent vector may be comprised in a plurality of labelled latent vectors in latent space. Given a particular style (e.g., Beethoven's style) among a plurality of styles, the CMG model may generate a piece of new music in the particular style. For example, unlabelled music data may be input into the VAE encoder. The VAE encoder may encode the unlabelled music data to a plurality of unlabelled latent vectors. The plurality of unlabelled latent vectors may follow Gaussian distribution. A plurality of labelled vectors may be generated by clustering the unlabelled latent vectors and sampling from Gaussian distribution using GMM. The labelled latent vectors may be fed to the VAE decoder. The VAE decoder may generate a piece of new music in the particular style. For instance, latent vectors in Beethoven's style may be found by the GMM. Latent vectors in Beethoven's style may be sent to the VAE decoder. The VAE decoder may generate music in Beethoven's style based on the input music data and the latent vectors in Beethoven's style.

The GMM may find useful semantic meaning from the music data. The GMM may interpret the music meaning of latent vectors in latent space. The GMM may classify latent vectors into different classes according to the semantic meanings implied in the original music. The GMM may contribute to generate music in specific styles. Compared to existing VAE which lacks controllability, the CMG model may generate highly controlled music through an unsupervised manner.

Figure 7:
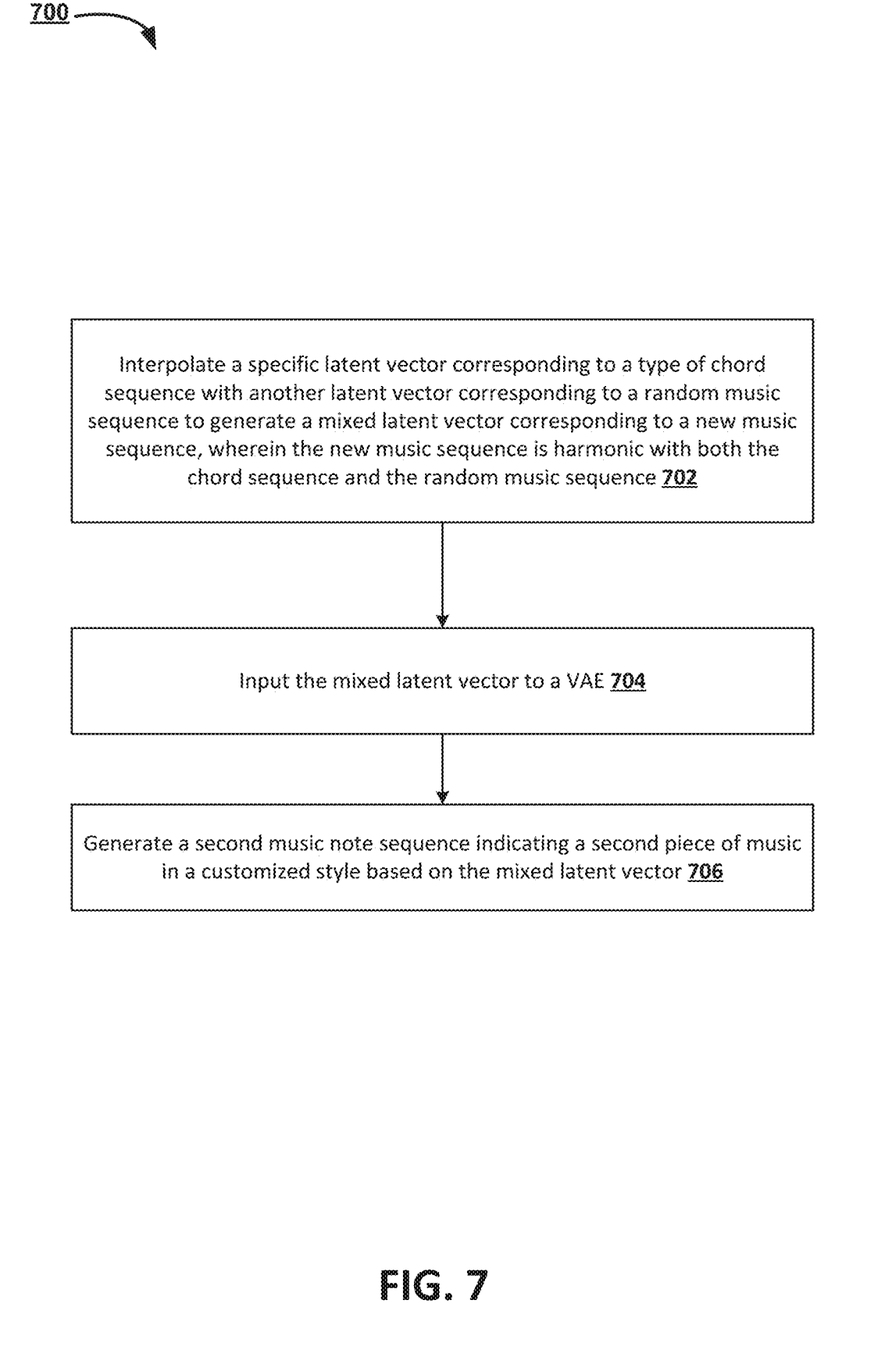
FIG. 7 illustrates an example process for generating a music note sequence in a customized style in accordance with the present disclosure.

FIG. 7 illustrates an example process 700 of generating a music note sequence in a customized style using a CMG model, such as the CMG model shown in FIG. 1. Although depicted as a sequence of operations in FIG. 7, those of ordinary skill in the art will appreciate that various embodiments may add, remove, reorder, or modify the depicted operations.

At 702, a specific latent vector (e.g., a specific latent vector corresponding to a type of chord sequence) may be interpolated with another latent vector to generate a mixed latent vector. In one example, the specific latent vector may be one of the plurality of labelled latent vectors generated by the GMM. The another latent vector may correspond to a random music sequence. The mixed latent vector may correspond to a new music sequence. The new music sequence may be harmonic with both the chord sequence and the random music sequence.

At 704, the mixed latent vector may be input to a VAE, such as the VAE 304 shown in FIG. 3. As discussed above, the VAE may have been pre-trained using unlabelled music data. The VAE may comprise a VAE encoder and a VAE decoder. The mixed latent vector may be input to the VAE decoder. In one embodiment, the mixed latent vectors may be fed to the VAE decoder to generate a piece of new music.

At 706, a second music note sequence may be generated. The second music note sequence may indicate a second piece of music. The second piece of music may be in a customized style based on the mixed latent vector. In one embodiment, a meaningful music note sequence may be generated by the VAE encoder based on the mixed latent vector. The meaningful sequence may indicate a piece of music in a customized style. The meaningful sequence may be harmonic with both the random sequence and the chord sequence. Using the CMG model, music in desired style may be generated by interpolating between different latent vectors. The CMG model may be useful for music generation and especially for multi-track music composition.

Figure 8:
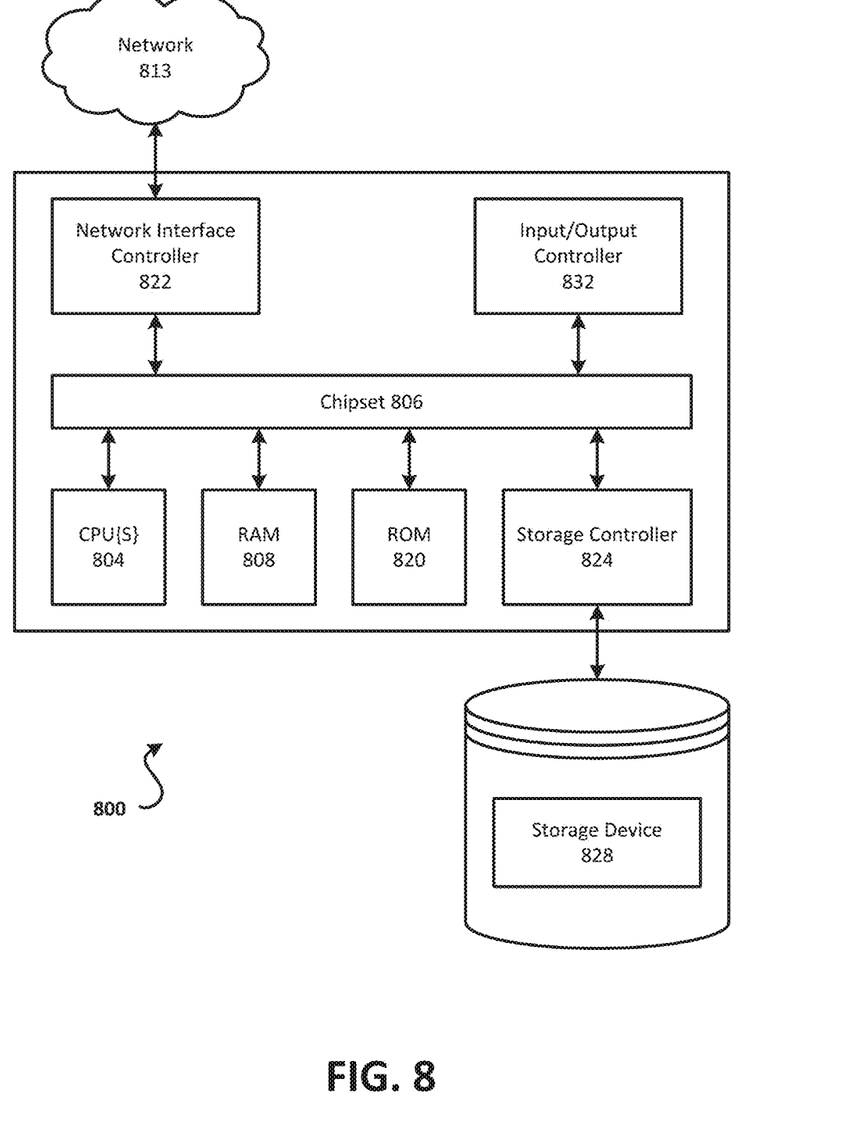
FIG. 8 illustrates an example computing device that may be used in accordance with the present disclosure.

FIG. 8 depicts a computing device that may be used in various aspects. With regard to the example environment of FIG. 1, one or more of services 108 or client devices 104 may be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in the present disclosure.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s). The GPU(s) may comprise processing units specialized for but not necessarily limited to highly parallel computations, such as graphics and other visualization-related processing.

A user interface may be provided between the CPU(s) 804 and the remainder of the components and devices on the baseboard. The interface may be used to access a random access memory (RAM) 808 used as the main memory in the computing device 800. The interface may be used to access a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein. The user interface may be provided by a one or more electrical components such as the chipset 806.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 813. It should be appreciated that multiple NICs 822 may be present in the computing device 800, connecting the computing device to other types of networks and remote computer systems.

The computing device 800 may be connected to a storage device 828 that provides non-volatile storage for the computer. The storage device 828 may store system programs, application programs, other program modules, and data, which have been described in greater detail herein. The storage device 828 may be connected to the computing device 800 through a storage controller 824 connected to the chipset 806. The storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 828 is characterized as primary or secondary storage and the like.

For example, the computing device 800 may store information to the storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the storage device 828 by detecting the physical states or characteristics of one or more particular locations within the physical storage units.

In addition or alternatively to the storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 828 may store other system or application programs and data utilized by the computing device 800.

The storage device 828 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in the present disclosure.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
extracting latent vectors from unlabelled data by an encoder, the unlabelled data comprising a plurality of music note sequences, the plurality of music note sequences indicating a plurality of pieces of music;
clustering the latent vectors into a plurality of classes corresponding to a plurality of music styles by a machine learning model;
generating a plurality of labelled latent vectors corresponding to the plurality of music styles by the machine learning model, each of the plurality of labelled latent vectors comprising information indicating features of a corresponding music style among the plurality of music styles; and
generating, by a decoder, a first music note sequence indicating a first piece of music in a particular music style among the plurality of music styles based at least in part on a particular labelled latent vector among the plurality of labelled latent vectors, the particular labelled latent vector corresponding to the particular music style.

2. The method of claim 1, wherein the encoder comprises an encoder of a variational autoencoder (VAE), wherein the decoder comprises a decoder of the VAE, and wherein the method further comprises:
inputting the particular labelled latent vector to the decoder of the VAE.

3. The method of claim 2, wherein the VAE is trained using unlabelled music training data, the encoder of the VAE learns to encode the unlabelled music training data into Gaussian distributions, and the decoder of the VAE learns to decode latent vectors sampled from the Gaussian distributions into pieces of music.

4. The method of claim 1, wherein the machine learning model comprises a Gaussian Mixture Model (GMM).

5. The method of claim 4, wherein the GMM is trained using unlabelled latent vectors extracted by an encoder of a VAE from unlabelled music training data.

6. The method of claim 1, further comprising:
interpolating, by a controllable music generation model, a specific latent vector corresponding to a type of chord sequence with another latent vector corresponding to a random music sequence to generate a mixed latent vector corresponding to a new music sequence, wherein the specific latent vector is among the plurality of labelled latent vectors, and wherein the new music sequence is harmonic with both the chord sequence and the random music sequence.

7. The method of claim 6, further comprising:
inputting the mixed latent vector to a VAE comprising the decoder; and
generating, by the decoder, a second music note sequence indicating a second piece of music in a customized style based on the mixed latent vector.

8. A system, comprising:
at least one processor; and
at least one memory communicatively coupled to the at least one processor and storing instructions that upon execution by the at least one processor cause the system to perform operations, the operations comprising:
extracting latent vectors from unlabelled data by an encoder, the unlabelled data comprising a plurality of music note sequences, the plurality of music note sequences indicating a plurality of pieces of music;

clustering the latent vectors into a plurality of classes corresponding to a plurality of music styles by a machine learning model;

generating a plurality of labelled latent vectors corresponding to the plurality of music styles by the machine learning model, each of the plurality of labelled latent vectors comprising information indicating features of a corresponding music style among the plurality of music styles; and generating, by a decoder, a first music note sequence indicating a first piece of music in a particular music style among the plurality of music styles based at least in part on a particular labelled latent vector among the plurality of labelled latent vectors, the particular labelled latent vector corresponding to the particular music style.

9. The system of claim 8, wherein the encoder comprises an encoder of a variational autoencoder (VAE), wherein the decoder comprises a decoder of the VAE, and wherein the operations further comprising comprise:

inputting the particular labelled latent vector to the decoder of the VAE.

10. The system of claim 9, wherein the VAE is trained using unlabelled music training data, the encoder of the VAE learns to encode the unlabelled music training data into Gaussian distributions, and the decoder of the VAE learns to decode latent vectors sampled from the Gaussian distributions into pieces of music.

11. The system of claim 8, wherein the machine learning model comprises a Gaussian Mixture Model (GMM).

12. The system of claim 11, wherein the GMM is trained using unlabelled latent vectors extracted by an encoder of a VAE from unlabelled music training data.

13. The system of claim 8, the operations further comprising:

interpolating, by a controllable music generation model, a specific latent vector corresponding to a type of chord sequence with another latent vector corresponding to a random music sequence to generate a mixed latent vector corresponding to a new music sequence, wherein the specific latent vector is among the plurality of labelled latent vectors, and wherein the new music sequence is harmonic with both the chord sequence and the random music sequence.

14. The system of claim 13, the operations further comprising:

inputting the mixed latent vector to the VAE comprising the decoder; and generating, by the decoder, a second music note sequence indicating a second piece of music in a customized style based on the mixed latent vector.

15. A non-transitory computer-readable storage medium, storing computer-readable instructions that upon execution by a processor cause the processor to implement operations, the operation comprising:

extracting latent vectors from unlabelled data by an encoder, the unlabelled data comprising a plurality of music note sequences, the plurality of music note sequences indicating a plurality of pieces of music;

clustering the latent vectors into a plurality of classes corresponding to a plurality of music styles by a machine learning model;

generating a plurality of labelled latent vectors corresponding to the plurality of music styles by the machine learning model, each of the plurality of labelled latent vectors comprising information indicating features of a corresponding music style among the plurality of music styles; and generating, by a decoder, a first music note sequence indicating a first piece of music in a particular music style among the plurality of music styles based at least in part on a particular labelled latent vector among the plurality of labelled latent vectors, the particular labelled latent vector corresponding to the particular music style.

16. The non-transitory computer-readable storage medium of claim 15, wherein the encoder comprises an encoder of a variational autoencoder (VAE), wherein the decoder comprises a decoder of the VAE, and wherein the operations further comprise:

inputting the particular labelled latent vector to the decoder of the VAE; and wherein the VAE is trained using unlabelled music training data, the encoder of the VAE learns to encode the unlabelled music training data into Gaussian distributions, and the decoder of the VAE learns to decode latent vectors sampled from the Gaussian distributions into pieces of music.

17. The non-transitory computer-readable storage medium of claim 15, wherein the machine learning model comprises a Gaussian Mixture Model (GMM).

18. The non-transitory computer-readable storage medium of claim 17, wherein the GMM is trained using unlabelled latent vectors extracted by an encoder of a VAE from unlabelled music training data.

19. The non-transitory computer-readable storage medium of claim 15, the operations further comprising:

interpolating, by a controllable music generation model, a specific latent vector corresponding to a type of chord sequence with another latent vector corresponding to a random music sequence to generate a mixed latent vector corresponding to a new music sequence, wherein the specific latent vector is among the plurality of labelled latent vectors, and wherein the new music sequence is harmonic with both the chord sequence and the random music sequence.

20. The non-transitory computer-readable storage medium of claim 19, the operations further comprising:

inputting the mixed latent vector to a VAE comprising the decoder; and generating, by the decoder, a second music note sequence indicating a second piece of music in a customized style based on the mixed latent vector.

* * * * *